US007740067B2

(12) United States Patent
Bour et al.

(10) Patent No.: US 7,740,067 B2
(45) Date of Patent: *Jun. 22, 2010

(54) METHOD TO CONTROL THE PHYSICAL INTERFACE BETWEEN TWO OR MORE FLUIDS

(75) Inventors: Daniel Bour, Mandeville, LA (US); Ronnie G. Morgan, Waurika, OK (US); Christopher L. Gordon, Duncan, OK (US); Melissa G. Allin, Comache, OK (US); Renee Manuel, Lafayette, LA (US); Robert Bales, Houma, LA (US); Mark R. Savery, Duncan, OK (US); John L. Dennis, Jr., Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/742,430

(22) Filed: Apr. 30, 2007

(65) Prior Publication Data

US 2008/0060820 A1 Mar. 13, 2008

Related U.S. Application Data

(63) Continuation-in-part of application No. 11/531,579, filed on Sep. 13, 2006.

(51) Int. Cl.
 E21B 33/00 (2006.01)
 E21B 33/12 (2006.01)
(52) U.S. Cl. ...................... 166/285; 166/386
(58) Field of Classification Search ................ None
 See application file for complete search history.

(56) References Cited

U.S. PATENT DOCUMENTS 2,274,297 A * 2/1942 Irons et al. ............. 166/288

(Continued)

FOREIGN PATENT DOCUMENTS

FR 2863301 A1 * 12/2003

(Continued)

OTHER PUBLICATIONS

SandWedge NT Conductivity Enhancement System, 05/05, Halliburton Communications.*

(Continued)

Primary Examiner—Zakiya W Bates
Assistant Examiner—Angela M DiTrani
(74) Attorney, Agent, or Firm—Craig W. Roddy; Conley Rose, P.C.

(57) ABSTRACT

A method of servicing a wellbore comprising preparing a liquid plug, allowing the liquid plug to polymerize into a highly deformable elastic plug, and placing the highly deformable elastic plug into a wellbore. A method of servicing a wellbore comprising preparing a liquid plug, allowing the liquid plug to polymerize into a highly deformable elastic plug, combining the highly deformable elastic plug with at least one conventional plug to form plug combination, and placing the plug combination into a wellbore. A method of servicing a wellbore comprising preparing a liquid plug, allowing the liquid plug to polymerize into a highly deformable elastic plug, placing the highly deformable elastic plug into a wellbore, and deforming the highly deformable elastic plug.

20 Claims, 4 Drawing Sheets

U.S. PATENT DOCUMENTS

| | | | |
|---|---|---|---|
| 2,650,195 A | | 8/1953 | Cardwell et al. |
| 2,815,079 A | | 12/1957 | Goins, Jr., et al. |
| 3,208,524 A | * | 9/1965 | Horner et al. ............... 166/294 |
| 3,490,535 A | | 1/1970 | Messenger |
| 3,749,173 A | | 7/1973 | Hill et al. |
| 3,929,191 A | | 12/1975 | Graham et al. |
| 4,042,032 A | | 8/1977 | Anderson et al. |
| 4,070,865 A | | 1/1978 | McLaughlin |
| 4,158,388 A | | 6/1979 | Owen et al. |
| 4,175,619 A | | 11/1979 | Davis |
| 4,190,112 A | | 2/1980 | Davis |
| 4,304,300 A | | 12/1981 | Watson |
| 4,423,781 A | | 1/1984 | Thomas |
| 4,428,427 A | * | 1/1984 | Friedman ..................... 166/278 |
| 4,439,328 A | | 3/1984 | Moity |
| 4,474,240 A | | 10/1984 | Oliver, Jr. et al. |
| 4,530,402 A | | 7/1985 | Smith et al. |
| 4,627,496 A | | 12/1986 | Ashford et al. |
| 4,674,573 A | | 6/1987 | Bode |
| 4,683,949 A | * | 8/1987 | Sydansk et al. ............. 166/270 |
| 4,706,747 A | | 11/1987 | Schneider |
| 4,756,365 A | | 7/1988 | Schneider |
| 4,829,100 A | | 5/1989 | Murphey et al. |
| 4,957,166 A | | 9/1990 | Sydansk |
| 4,957,174 A | | 9/1990 | Whitfill et al. |
| 4,964,465 A | | 10/1990 | Surles |
| 5,058,676 A | | 10/1991 | Fitzpatrick et al. |
| 5,076,944 A | | 12/1991 | Cowan et al. |
| 5,101,902 A | | 4/1992 | Parcevaux et al. |
| 5,128,390 A | | 7/1992 | Murphey et al. |
| 5,159,980 A | * | 11/1992 | Onan et al. ................... 166/294 |
| 5,180,020 A | | 1/1993 | Fuh et al. |
| 5,207,282 A | | 5/1993 | Fuh et al. |
| 5,232,961 A | | 8/1993 | Murphey et al. |
| 5,321,062 A | | 6/1994 | Landrum et al. |
| 5,322,124 A | | 6/1994 | Cowan et al. |
| 5,346,011 A | * | 9/1994 | Onan et al. ................... 166/291 |
| 5,346,012 A | | 9/1994 | Heathman et al. |
| 5,437,330 A | | 8/1995 | Gambertoglio |
| 5,559,086 A | | 9/1996 | Dewprashad et al. |
| 5,588,488 A | | 12/1996 | Vijn et al. |
| 5,609,207 A | | 3/1997 | Dewprashad et al. |
| 5,697,440 A | | 12/1997 | Weaver et al. |
| 5,712,314 A | * | 1/1998 | Surles et al. ................. 166/295 |
| 5,775,425 A | | 7/1998 | Weaver et al. |
| 5,782,300 A | | 7/1998 | James et al. |
| 5,787,986 A | | 8/1998 | Weaver et al. |
| 5,826,669 A | | 10/1998 | Zaleski et al. |
| 5,833,000 A | | 11/1998 | Weaver et al. |
| 5,836,392 A | | 11/1998 | Urlwin-Smith |
| 5,839,510 A | | 11/1998 | Weaver et al. |
| 5,849,674 A | | 12/1998 | Fox et al. |
| 5,853,048 A | | 12/1998 | Weaver et al. |
| 5,871,049 A | | 2/1999 | Weaver et al. |
| 5,873,413 A | | 2/1999 | Chatterji et al. |
| 5,875,844 A | | 3/1999 | Chatterji et al. |
| 5,875,845 A | | 3/1999 | Chatterji et al. |
| 5,875,846 A | | 3/1999 | Chatterji et al. |
| 5,911,282 A | | 6/1999 | Onan et al. |
| 5,913,364 A | * | 6/1999 | Sweatman ................... 166/281 |
| 5,957,204 A | | 9/1999 | Chatterji et al. |
| 5,960,878 A | | 10/1999 | Nguyen et al. |
| 5,969,006 A | | 10/1999 | Onan et al. |
| 6,006,835 A | | 12/1999 | Onan et al. |
| 6,006,836 A | | 12/1999 | Chatterji et al. |
| 6,012,524 A | | 1/2000 | Chatterji et al. |
| 6,036,765 A | | 3/2000 | Farrow et al. |
| 6,047,772 A | | 4/2000 | Weaver et al. |
| 6,059,035 A | | 5/2000 | Chatterji et al. |
| 6,060,434 A | | 5/2000 | Sweatman et al. |
| 6,068,055 A | | 5/2000 | Chatterji et al. |
| 6,069,117 A | | 5/2000 | Onan et al. |
| 6,098,711 A | | 8/2000 | Chatterji et al. |
| 6,124,246 A | | 9/2000 | Heathman et al. |
| 6,152,227 A | | 11/2000 | Lawson et al. |
| 6,167,967 B1 | | 1/2001 | Sweatman |
| 6,192,986 B1 | | 2/2001 | Urlwin-Smith |
| 6,196,311 B1 | | 3/2001 | Treece |
| 6,196,317 B1 | | 3/2001 | Hardy |
| 6,209,643 B1 | | 4/2001 | Nguyen et al. |
| 6,231,664 B1 | | 5/2001 | Chatterji et al. |
| 6,234,251 B1 | | 5/2001 | Chatterji et al. |
| 6,244,344 B1 | | 6/2001 | Chatterji et al. |
| 6,258,757 B1 | | 7/2001 | Sweatman et al. |
| 6,271,181 B1 | | 8/2001 | Chatterji et al. |
| 6,279,652 B1 | | 8/2001 | Chatterji et al. |
| 6,311,773 B1 | | 11/2001 | Todd et al. |
| 6,321,841 B1 | | 11/2001 | Eoff et al. |
| 6,328,106 B1 | | 12/2001 | Griffith et al. |
| 6,330,917 B2 | | 12/2001 | Chatterji et al. |
| 6,350,309 B2 | | 2/2002 | Chatterji et al. |
| 6,367,549 B1 | | 4/2002 | Chatterji et al. |
| 6,378,363 B1 | | 4/2002 | Hache et al. |
| 6,401,817 B1 | | 6/2002 | Griffith et al. |
| 6,427,775 B1 | | 8/2002 | Dusterhoft et al. |
| 6,446,722 B2 | | 9/2002 | Nguyen et al. |
| 6,448,206 B1 | | 9/2002 | Griffith et al. |
| 6,457,524 B1 | | 10/2002 | Roddy |
| 6,503,870 B2 | | 1/2003 | Griffith et al. |
| 6,508,306 B1 | | 1/2003 | Reddy et al. |
| 6,523,612 B2 | * | 2/2003 | Reynolds ..................... 166/312 |
| 6,555,507 B2 | | 4/2003 | Chatterji et al. |
| 6,593,402 B2 | | 7/2003 | Chatterji et al. |
| 6,595,289 B2 | | 7/2003 | Tumlin et al. |
| 6,664,215 B1 | | 12/2003 | Tomlinson |
| 6,668,926 B2 | | 12/2003 | Nguyen et al. |
| 6,691,780 B2 | | 2/2004 | Nguyen et al. |
| 6,703,351 B2 | * | 3/2004 | Stowe et al. ................. 507/117 |
| 6,705,400 B1 | | 3/2004 | Nguyen et al. |
| 6,725,926 B2 | | 4/2004 | Nguyen et al. |
| 6,725,931 B2 | | 4/2004 | Nguyen et al. |
| 6,729,404 B2 | | 5/2004 | Nguyen et al. |
| 6,732,800 B2 | | 5/2004 | Acock et al. |
| 6,742,590 B1 | | 6/2004 | Nguyen |
| 6,755,245 B2 | | 6/2004 | Nguyen et al. |
| 6,762,156 B2 | | 7/2004 | Heathman et al. |
| 6,776,236 B1 | | 8/2004 | Nguyen |
| 6,838,417 B2 | | 1/2005 | Bouwmeester et al. |
| 6,861,392 B2 | | 3/2005 | Shaarpour |
| 6,866,099 B2 | | 3/2005 | Nguyen |
| 6,875,729 B2 | | 4/2005 | Verlaan et al. |
| 6,880,642 B1 | | 4/2005 | Garrett et al. |
| 6,881,708 B2 | | 4/2005 | Reddy et al. |
| 6,887,833 B2 | | 5/2005 | Brothers et al. |
| 6,887,834 B2 | | 5/2005 | Nguyen et al. |
| 6,889,768 B2 | | 5/2005 | Girgenti |
| 6,889,780 B2 | | 5/2005 | Whitfill et al. |
| 6,892,813 B2 | | 5/2005 | Nguyen et al. |
| 6,920,929 B2 | | 7/2005 | Bour |
| 6,936,574 B2 | * | 8/2005 | Dao et al. .................... 507/269 |
| 7,044,222 B2 | | 5/2006 | Tomlinson |
| 7,066,285 B2 | | 6/2006 | Shaarpour |
| 7,077,203 B1 | | 7/2006 | Roddy et al. |
| 7,131,491 B2 | | 11/2006 | Blauch et al. |
| 7,147,056 B2 | | 12/2006 | Brothers et al. |
| 7,174,962 B1 | | 2/2007 | Roddy et al. |
| 7,213,645 B2 | | 5/2007 | Sweatman et al. |
| 7,297,662 B2 | | 11/2007 | Verret |
| 7,351,681 B2 | | 4/2008 | Reddy et al. |
| 7,669,653 B2 | * | 3/2010 | Craster et al. ............... 166/187 |
| 2003/0008778 A1 | | 1/2003 | Donaldson et al. |
| 2003/0181338 A1 | * | 9/2003 | Sweatman et al. .......... 507/100 |
| 2004/0132625 A1 | * | 7/2004 | Halliday et al. ............. 507/100 |
| 2005/0059558 A1 | | 3/2005 | Blauch et al. |

| | | | |
|---|---|---|---|
| 2005/0092489 A1 | 5/2005 | Welton et al. | |
| 2005/0109506 A1 | 5/2005 | Slabaugh et al. | |
| 2005/0124502 A1 | 6/2005 | Shaarpour | |
| 2005/0277554 A1 | 12/2005 | Blauch et al. | |
| 2006/0019835 A1* | 1/2006 | Kayser et al. | 507/121 |
| 2006/0102351 A1* | 5/2006 | Crabtree et al. | 166/295 |
| 2006/0178275 A1 | 8/2006 | Shaarpour | |
| 2006/0234871 A1 | 10/2006 | Dalrymple et al. | |
| 2007/0125534 A1 | 6/2007 | Reddy et al. | |
| 2007/0169937 A1 | 7/2007 | Allin et al. | |
| 2007/0173412 A1 | 7/2007 | Allin et al. | |

FOREIGN PATENT DOCUMENTS

WO         0224771 A2       3/2002

OTHER PUBLICATIONS

FlexPlug Service, 1998, Halliburton Energy Services.*
Darby, Ronald, Viscoelastic Fluids: An Introduction to their Properties and Behavior, Chapter 1: Sections 1.1-1.6, 1976, pp. 1-12 + cover, Marcel Dekker, Inc., New York.
Gere, James M., et al., Mechanics of Materials, Chapter 1: Sections 1.1-1.8, 1997, 64 pgs. + cover, PWS Publishing Co., Boston, MA.
Halliburton brochure, "Flexplug® OBM: Lost-Circulation Material," Cementing, Oct. 2005, 1 pg., Halliburton Fluid Systems.
Halliburton brochure, "Flexplug® Service: Helps Operator Solve Lost Circulation Problems Quickly and Effectively," Cementing, 1 pg.
Halliburton brochure, "FlexPlug(SM) Service: Stop Lost Circulation, Hold Your Bottom Line," Lost Circulation Solutions, Apr. 1998, 2 pgs., Halliburton Energy Services, Inc., U.S.A.
Halliburton brochure, "Flexplug® W: Lost-Circulation Material," Cementing, Oct. 2005, 1 pg., Halliburton Fluid Systems.
Halliburton brochure, "HZ-10: Polymer," Conformance Technology, 1 pg.
Halliburton brochure, "HZ-20: Crosslinker," Conformance Technology, 1 pg.
Halliburton brochure, "Production Enhancement: H2Zero™ Service," Oct. 26, 2006, 4 pgs., www.halliburton.com/public/pe/contents/Data_Sheets/Web/H/H00216R.asp?print=....
Halliburton brochure, "SandWedge® NT Conductivity Enhancement System: Enhances Proppant Pack Conductivity and Helps Prevent Intrusion of Formation Material for Improved Long-Term Production," Stimulation, May 2005, 2 pgs., Halliburton Communications, U.S.A.
Halliburton brochure, "Steelseal® Fine: Lost Circulation Material," Baroid Fluid Services, Product Data Sheet, Sep. 5, 2006, 1 pg., Halliburton Fluid Systems.
Halliburton brochure, "Thermatek(SM) Service: Helps meet the challenges of severe lost circulation, near wellbore water shutoffs and plugging operations," Stimulation, 1 pg.
Halliburton brochure, "Wellbore Stress Management(SM) Service," Top Technology Solutions 2006, 1 pg.
Halliburton 2001 press release, "Halliburton Performs First H2Zero™ Conformance Solution Job in North America," Oct. 26, 2006, 2 pgs., www.haliburton.com/news/archive/2001esgnws_082201.jsp.
Steffe, James F., Rheological Methods in Food Process Engineering, Chapter 1: Sections 1.1-1.4, 1992, pp. 1-12 + cover, Freeman Press.
Walters, Harold G., et al., "Kinetic Rheology of Hydraulic Fracturing Fluids," SPE 71660, 2001, 12 pgs, Society of Petroleum Engineers, Inc.
Office Action dated May 17, 2007 from U.S. Appl. No. 11/531,579, 13 pgs.
Patent application entitled "Method to Control the Physical Interface Between Two or More Fluids," filed Sep. 13, 2006, as U.S. Appl. No. 11/531,579.
Alberty, Mark et al., "A Physical Model for Stress Cages" SPE 90493, dated Sep. 2004.
Aston, M.S. et al., "Drilling Fluids for Wellbore Strengthening" IADC/SPE 87130, dated Mar. 2004.
Baroid brochure "DIAMOND SEAL™ Absorbent Polymer for Lost Circulation" dated Aug. 2000.
Baroid brochure "STEELSEAL® Lost Circulation Material" dated Apr. 2005.
Baroid brochure entitled "HYDRO-PLUG™ Lost Circulation Plug" dated Sep. 2002.
Dupriest, Fred, "Fracture Closure Stress (FCS) And Lost Returns Practices" SPEI/ADC 92192, dated Feb. 2005.
Fuh, Giin-Fa, et al., "A New Approach To Preventing Lost Circulation While Drilling", SPE 24599, dated Oct. 1992.
Halliburton brochure entitled "Expedite® Service" dated Jun. 2005.
Halliburton brochure entitled "StrataLock™ Wellbore/Formation Stabilization System" dated Oct. 2003.
Hardy, Mary et al., "The first carbonate field application of a new organically crosslinked water shutoff polymer system", SPE 50738 dated Feb. 1999.
Hardy, Mary et at., "New organically crosslinked polymer system provides competent propagation at high temperature in conformance treatments" SPE 39690 dated Apr. 1998.
HYDRO-PLUG™ Technical Information bulletin.
"Introduction To The Mini MACS Analyzer" Section 1, pp. 1-1 to 1-6, dated Jun. 1997.
Office Action dated May 1, 2007 for U.S Appl. No. 11/337,707 (21 pages).
Sweatman, Ron et at., "Formation Pressure Integrity Treatments Optimize Drilling and Completion Of HTHP Production Hole Sections" SPE 68946, dated May 2001.
Tare, Uday et al., "Drilling Fluid Losses and Gains: Case Histories And Practical Solutions" SPE 71368, dated Sep. 2001.
Whitfill, Donald et al., "All Lost-Circulation Materials And System Are Not Created Equal" SPE 84319, dated Oct. 2003.
Whitfill, Donald et al., "Borehole Stress Treatments—An Engineered Approach To Prevent Lost Circulation".
Whitfill, Donald et al., "Managing Wellbore Pressure Containment" dated May 2005.
Office Action dated Oct. 16, 2007 (38 pages), U.S. Appl. No. 11/337,707, filed Jan. 23, 2006.
Office Action on U.S. Appl. No. 11/531,579 dated Oct. 31, 2007.
Office Action dated Apr. 29, 2008 (16 pages), U.S. Appl. No. 11/531,579, filed Sep. 13, 2006.
Office Action dated Aug. 14, 2008 (19 pages), U.S. Appl. No. 11/337,707, filed Jan. 23, 2006.
Office Action dated Jul. 23, 2009 (19 pages), U.S. Appl. No. 11/337,713, filed Jan. 23, 2006.
Office Action dated Oct. 14, 2009 (19 pages), U.S. Appl. No. 11/337,707, filed Jan. 23, 2006.
Office Action (Final) dated Nov. 17, 2009 (17 pages), U.S. Appl. No. 11/531,579, filed Sep. 13, 2006.
Office Action dated Dec. 9, 2009 (11 pages), U.S. Appl. No. 11/337,713, filed Jan. 23, 2006.
Office Action (Final) dated Dec. 4, 2008 (19 pages), U.S. Appl. No. 11/531,579, filed Sep. 13, 2006.
Office Action dated Jan. 22, 2009 (41 pages), U.S. Appl. No. 11/337,713, filed Jan. 23, 2006.
Advisory Action dated Feb. 27, 2009 (3 pages), U.S. Appl. No. 11/531,579, filed Sep. 13, 2006.
Advisory Action dated Apr. 20, 2009 (4 pages), U.S. Appl. No. 11/337,707, filed on Jan. 23, 2006.
Office Action (Final) dated Feb. 10, 2009 (16 pages), U.S. Appl. No. 11/337,707, filed Jan. 23, 2006.
Office Action dated May 20, 2009 (18 pages), U.S. Appl. No. 11/531,579, filed Sep. 13, 2006.
Foreign Communication from a related counterpart application—International Search Report and Written Opinion, PCT/GB2007/003434, Dec. 20, 2007, 19 pages.
Office Action (Final) dated April 17, 2008 (19 pages), U.S. Appl. No. 11/742,430, filed Apr. 30, 2007.

* cited by examiner

METHOD TO CONTROL THE PHYSICAL INTERFACE BETWEEN TWO OR MORE FLUIDS

CROSS-REFERENCE TO RELATED APPLICATIONS

The present application is a Continuation-in-Part application to U.S. patent application Ser. No. 11/531,579, filed on Sep. 13, 2006 and entitled "Method to Control the Physical Interface between Two or more Fluids." The present application is also related to U.S. patent application Ser. No. 11/337,707, filed on Jan. 23, 2006 and entitled "Method of Using Lost Circulation Composition." Each of the above applications is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

1. Field of the Invention

This disclosure relates to a method for preventing the intermixing of wellbore servicing fluids in a wellbore through the use of a highly deformable elastic plug.

2. Background of the Invention

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. There are cases in which cement is pumped in the reverse direction, being pumped down the annulus, into the bottom of the casing or liner. Subsequent secondary cementing operations, i.e., any cementing operation after the primary cementing operation, may also be performed. Examples of secondary cementing operations include squeeze cementing whereby a cement slurry is forced under pressure to areas of lost integrity in the annulus to seal off those areas, and the setting of temporary or permanent cement plugs in order to seal off a desired region of the wellbore.

To perform cementing operations, a cementing manifold is usually disposed between a top drive unit or rotary table and a work string extending into the well. The cementing manifold is designed to allow fluids, such as drilling mud or cement, to flow there through while simultaneously enclosing and protecting from flow one or more darts that are released on demand and in sequence to perform various operations downhole, including wiping pipe surfaces, separating fluids, and actuating downhole tools. Thus, as fluid flows through the cementing manifold, the darts are isolated from the fluid flow until they are ready for release.

Within the borehole, the work string, with one or more cementing plugs disposed at a lower end thereof, extends into and connects to a casing running tool that suspends the casing string to be cemented. Thus, the work string is positioned upstream of the casing string. The work string runs the casing string into the borehole to the desired depth, and the casing string fills with drilling fluid or other fluid in the well as it is being run in. When the casing string is positioned at the desired depth, cement is pumped downhole through the work string. As the cement is pumped, a dart or other device is released from the cementing manifold and propelled down the work string ahead of the batch of cement. The dart lands in a seat in one of the cementing plugs at the lower end of the work string, and the pressure behind the dart causes the cementing plug to be released as the cement pushes the plug down. Thus, the cementing plug is released by the dart ahead of the cement batch. This cementing plug maintains a separation between the cement slurry and the drilling fluid, and thereby reduces contamination of the cement slurry as it flows into the casing string. The cementing plug that precedes the cement slurry and separates it from the drilling fluid is referred to herein as the "bottom cementing plug." This bottom cementing plug also sealingly engages the inner surface of the casing string to wipe the drilling fluid from the walls of the casing string ahead of the cement slurry. The bottom cementing plug then lands on a float collar or float shoe attached within the bottom end of the casing string.

When the bottom cementing plug lands on the float collar or float shoe attached to the bottom of the casing string, a bypass mechanism in the bottom cementing plug is actuated to allow the cement slurry to proceed through the bottom cementing plug, through the float collar or float shoe and upwardly into the well bore annulus between the casing string and the borehole wall. When the required quantity of cement slurry has been pumped through the work string, a second dart or other device is launched from the cementing manifold to follow the cement batch. This dart is pushed along by a displacement fluid and wipes cement from the walls of the work string, then lands in a releasing sleeve of a second cementing plug at the lower end of the work string. The second cementing plug, referred to herein as the "top cementing plug", is thereby released from the work string to separate the cement slurry from additional drilling fluid or other fluid used to displace the cement slurry through the casing string. The design of the top cementing plug is such that when it lands on the bottom cementing plug at the lower end of the casing string, it shuts off fluid flow through both the top and bottom cementing plugs, which prevents the displacement fluid from entering the well bore annulus.

Despite the prevalent use of conventional plugs, these plugs can fail, or are incompatible with a given application. Plugs with flexible wipers can deteriorate and disintegrate under normal operating conditions and damaged plugs may not adequately prevent the intermingling of wellbore fluids and cements. There are other drawbacks associated with the use of these conventional plugs. For example, in liner applications a drill pipe wiper dart that latches into a conventional plug at the top of the liner is required to insure fluid separation through multiple pipe sizes. These plugs may also take time to drill out to continue operations and, many sizes of plugs of various types may be needed over the course of a drilling operation. Furthermore, when used to isolate zones in highly deviated wells, the conventional plugs may fail to set in a wellbore resulting in the inability to seal off all production below the point at which the plug is set.

Accordingly, an ongoing need exists for improved plugs to supplement or replace conventional plugs and for compositions and methods of minimizing the intermixing of wellbore servicing fluids and for isolating zones in a wellbore.

BRIEF SUMMARY

Disclosed herein is a method of servicing a wellbore comprising preparing a liquid plug, allowing the liquid plug to polymerize into a highly deformable elastic plug, and placing the highly deformable elastic plug into a wellbore.

Also disclosed herein is a method of servicing a wellbore comprising preparing a liquid plug, allowing the liquid plug to polymerize into a highly deformable elastic plug, combining the highly deformable elastic plug with at least one conventional plug to form plug combination, and placing the plug combination into a wellbore.

Further disclosed herein is a method of servicing a wellbore comprising preparing a liquid plug, allowing the liquid plug to polymerize into a highly deformable elastic plug, placing the highly deformable elastic plug into a wellbore, and deforming the highly deformable elastic plug.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF DRAWINGS

For a detailed description of the preferred embodiments of the apparatus and methods of the present disclosure, reference will now be made to the accompanying drawing in which.

DETAILED DESCRIPTION

Figure 1:
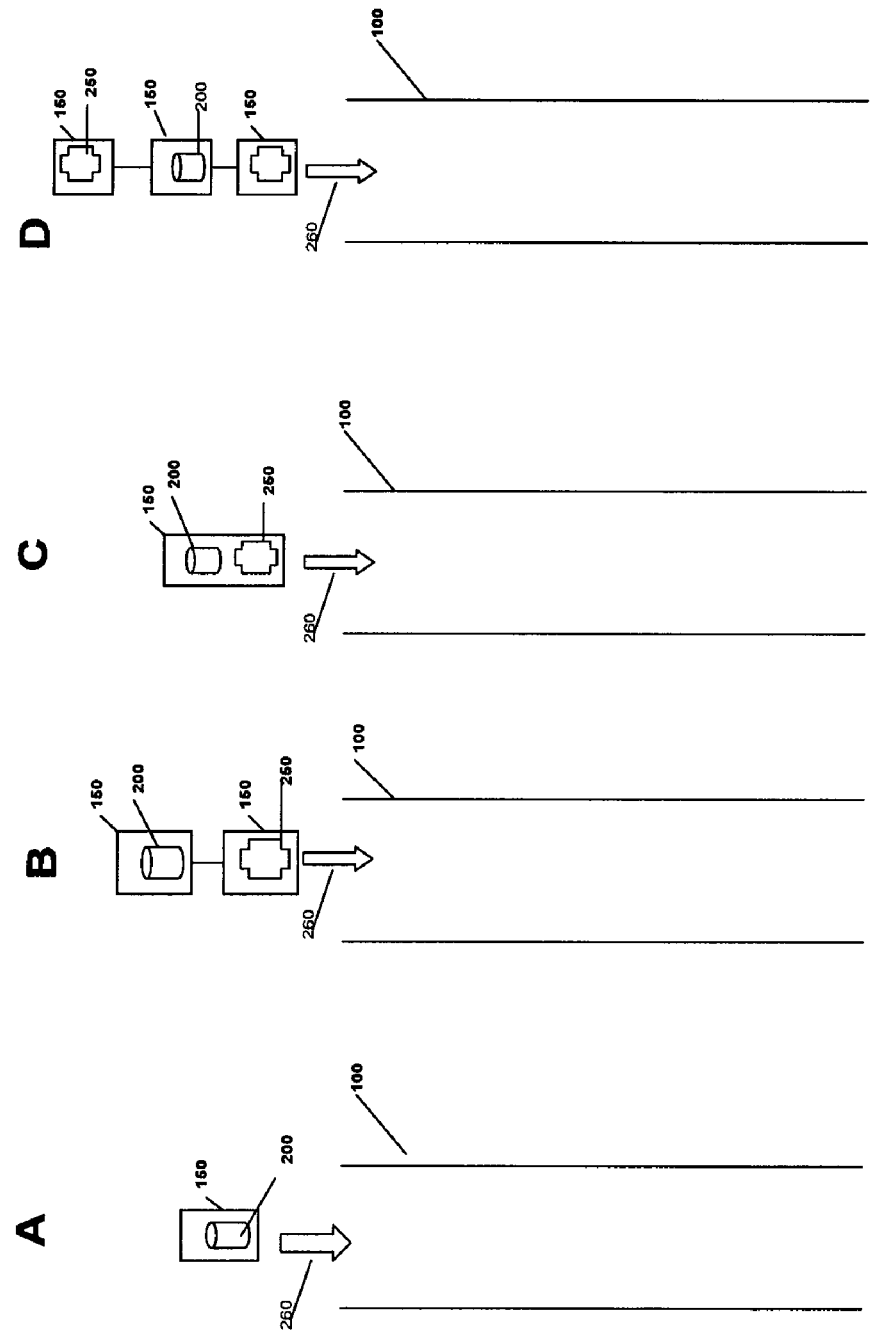
FIGS. 1A-1D are various embodiments of highly deformable elastic plugs being placed in a wellbore.

Disclosed herein are compositions and methods to prepare and use such compositions in a wellbore. The compositions of this disclosure may be termed highly deformable elastic plugs (HDEPs) and may be utilized in a variety of ways. These HDEPs may function to control the physical interface between two or more fluids, more specifically between two or more servicing fluids in a wellbore; to isolate one or more sections of a wellbore and/or may provide one or more functions typically provided by a conventional plug such as for example wiping, sealing, separating, launching etc.

In an embodiment, the method comprises using a HDEP to supplement or replace a conventional plug (e.g., mechanical plug, ball, darts, wiper plug) in one or more servicing applications. The conventional plugs employed in downhole operations such as cementing are usually made of drillable materials such as a pliable or rubbery material, for example plastic, wood or rubber, sometimes with hollow metal or plastic cores that fit snugly in the pipe string. Furthermore, such conventional plugs in contrast to the HDEPs of this disclosure may comprise a solid or rigid frame and/or member which may not be a necessary component of the HDEP. In an embodiment, the HDEP comprises a highly elastic material that can withstand large magnitudes of compressive deformation (strain), without plastic deformation or compressive failure, to control the physical interface between two or more servicing fluids in the wellbore. In another embodiment, the method comprises using a HDEP to isolate zones or sections of a wellbore.

The HDEP may be used separately or in conjunction with other wellbore plugs. In various embodiments, the HDEP may be formed by the complete or partial polymerization of a highly viscous material which cures to form the HDEP. HDEPs as described herein may be used to separate non-cementitious fluids during wellbore servicing, separate cement from displacement fluid during displacement of a cement job, enhance mud displacement during cementing, provide a plug for reverse circulation cementing operations, be used as a lost circulation material and/or as a carrier of lost circulation material during drilling operations, provide a base for plug cementing, enhance formation integrity following squeeze cementing operations or used in other wellbore servicing methods. Additionally, a HDEP may deform during use to allow passage through any number of pipe geometries or other flow restrictions, thereby reducing the risk and conventional problems associated with the multiple plug systems described previously.

In an embodiment, the HDEPs of this disclosure are formed from the complete or partial polymerization of a liquid plug (LP). Once the LP ingredients are mixed together, the LP material cures based on a temperature-time history and transitions from a pumpable paste to a highly elastic solid with properties similar to soft rubber. In an embodiment, such LPs may comprise a crosslinkable polymer system and a filler. Alternatively, the LPs may comprise a crosslinkable polymer system, a filler and a packing agent. Such LP compositions may be characterized, identified, and selected based upon various fluid parameters such as density, rheology, chemical composition, and diffusion/mixing coefficients. Rheology refers to measured viscometric shear stress and shear rate data as defined by Darby in *Viscoelastic Fluids—An Introduction To Their Properties and Behavior*; by Ronald Darby; Marcel Dekker Inc.; 1976; ISBN: 0-8247-6412-9); pages 52-70 incorporated by reference herein in its entirety. Once the LP is allowed to cure, the paste or thick fluid transforms into a deformable elastic solid, the HDEP. When force is applied to the cured HDEP, it's "stress-strain" behavior approximates that of a "Hookean Solid" as defined by Steffe in *Rheological Methods In Food Process Engineering*; by James F. Steffe; Freeman Press; 1992; ISBN: 0-9632036-1-4; pages 8-12 incorporated by reference herein in its entirety. The HDEP can withstand up to 50% strain (see Steffe) without significant permanent plastic deformation when the stress is removed.

In an embodiment, the LP comprises a crosslinkable polymer system. Examples of suitable crosslinkable polymer systems include, but are not limited to, the following: a water soluble copolymer of a non-acidic ethylenically unsaturated polar monomer and a copolymerizable ethylenically unsaturated ester; a terpolymer or tetrapolymer of an ethylenically unsaturated polar monomer, an ethylenically unsaturated ester, and a monomer selected from acrylamide-2-methylpropane sulfonic acid, N-vinylpyrrolidone, or both; or combinations thereof. The copolymer may contain from one to three polar monomers and from one to three unsaturated esters. The crosslinkable polymer system may also include at least one crosslinking agent, which is herein defined as a material that is capable of crosslinking such copolymers to form a gel. As used herein, a gel is defined as a crosslinked polymer network swollen in a liquid medium. The crosslinking agent may be, for example and without limitation, an organic crosslinking agent such as a polyalkyleneimine, a polyfunctional aliphatic amine such as polyalkylenepolyamine, an aralkylamine, a heteroaralkylamine, or combinations thereof. Examples of suitable polyalkyleneimines include without limitation polymerized ethyleneimine and propyleneimine. Examples of suitable polyalkylenepolyamines include without limitation polyethylene- and polypropylene-polyamines. A description of such copolymers and crosslinking agents can be found in U.S. Pat. Nos. 5,836,392; 6,192,986, and 6,196,317, each of which is incorporated by reference herein in its entirety.

The ethylenically unsaturated esters used in the crosslinkable polymer system may be formed from a hydroxyl compound and an ethylenically unsaturated carboxylic acid selected from the group consisting of acrylic, methacrylic, crotonic, and cinnamic acids. The ethylenically unsaturated group may be in the alpha-beta or beta-gamma position relative to the carboxyl group, but it may be at a further distance. In an embodiment, the hydroxyl compound is an alcohol generally represented by the formula ROH, wherein R is an alkyl, alkenyl, cycloalkyl, aryl, arylalkyl, aromatic, or heterocyclic group that may be substituted with one or more of a hydroxyl, ether, and thioether group. The substituent can be on the same carbon atom of the R group that is bonded to the hydroxyl group in the hydroxyl compound. The hydroxyl compound may be a primary, secondary, iso, or tertiary compound. In an embodiment, a tertiary carbon atom is bonded to the hydroxyl group, e.g., t-butyl and trityl. In an embodiment, the ethylenically unsaturated ester is t-butyl acrylate.

The non-acidic ethylenically unsaturated polar monomers used in the crosslinkable polymer system can be amides, e.g., primary, secondary, and/or tertiary amides, of an unsaturated carboxylic acid. Such amides may be derived from ammonia, or a primary or secondary alkylamine, which may be optionally substituted by at least one hydroxyl group as in alkylol amides such as ethanolamides. Examples of such carboxylic derived ethylenically unsaturated polar monomers include without limitation acrylamide, methacrylamide, and acrylic ethanol amide.

In an embodiment, the crosslinkable polymer system is a copolymer of acrylamide and t-butyl acrylate, and the crosslinking agent is polyethylene imine. These materials are commercially available as the $H_2$ZERO service providing conformance control system from Halliburton Energy Services. The $H_2$ZERO service providing conformance control system is a combination of HZ-10 polymer and HZ-20 crosslinker. HZ-10 is a low molecular weight polymer consisting of polyacrylamide and an acrylate ester. The gelation rate of the $H_2$ZERO service providing conformance control system is controlled by the unmasking of crosslinking sites on the HZ-20 polymer which is a polyethylene imine crosslinker.

The concentrations of both HZ-10 polymer and HZ-20 crosslinker contribute to the HDEP reaction time, its final conventional properties and stability. In an embodiment, the crosslinkable polymer system forms a viscous gel in from about 60 mins to about 300 mins, alternatively in from about 60 mins to about 300 mins at a temperature of from about 180° F. to about 320° F., alternatively from about 180° F. to about 225° F. and, alternatively from about 250° F. to about 320° F.

In an embodiment, the LP comprises a filler. Herein a filler refers to particulates, also termed finer filler material, designed to bridge off across the packing agent of the LP. Such fillers may be smaller in size than the packing agent. Details of the filler and packing agent size will be disclosed later herein. Such fillers may have a pH of from about 3 to about 10. In an embodiment, the filler has a specific gravity of less than about 1 to about 5, alternatively from about 1.5 to about 5, alternatively from about 1.75 to about 4. Without wishing to be limited by theory, fillers having a specific gravity in the disclosed range may produce a HDEP with greater flexibility and ductility.

Examples of suitable fillers include without limitation alkyl quaternary ammonium montmorillonite, bentonite, zeolites, barite, fly ash, calcium sulfate, and combinations thereof. In an embodiment the filler is an alkyl quaternary ammonium montmorillonite. In an embodiment, the filler is a water swellable or hydratable clay. In an alternative embodiment, the filler is an oil-based sealing composition that may comprise a hydratable polymer, an organophilic clay and a water swellable clay. Such oil-based sealing compositions are disclosed in U.S. Pat. Nos. 5,913,364; 6,167,967; 6,258,757; and 6,762,156, each of which is incorporated by reference herein in its entirety. In an embodiment, the filler material is FLEXPLUG OBM sealant, which is a deformable, viscous, cohesive oil-based composition comprising alkyl quaternary ammonium montmorillonite commercially available from Halliburton Energy Services.

In an embodiment, the LP comprises a packing agent. In an embodiment, the packing agent may be any organic or inorganic material that may be shredded or otherwise conditioned such that the material may be placed downhole and provide some structural support to the otherwise crosslinkable polymer system. Examples of packing agents include without limitation resilient materials such as graphite; fibrous materials such as cedar bark, shredded cane stalks and mineral fiber; flaky materials such as mica flakes and pieces of plastic or cellophane sheeting; and granular materials such as ground and sized limestone or marble, wood, nut hulls, formica, corncobs, gravel and cotton hulls. In an embodiment, the packing agent is a resilient graphite such as STEELSEAL or STEELSEAL FINE lost circulation additives which are dual composition graphite derivatives commercially available from Baroid Industrial Drilling Products, a Halliburton Energy Services company.

In another embodiment, the packing agent is a resin-coated particulate. Examples of suitable resin-coated particulates include without limitation resin-coated ground marble, resin-coated limestone, and resin-coated sand. In an embodiment, the packing agent is a resin-coated sand. The sand may be graded sand that is sized based on a knowledge of the size of the lost circulation zone. The graded sand may have a particle size in the range of from about 10 to about 70 mesh, U.S. Sieve Series. The graded sand can be coated with a curable resin, a tackifying agent or mixtures thereof. The hardenable resin compositions useful for coating sand and consolidating it into a hard fluid permeable mass generally comprise a hardenable organic resin and a resin-to-sand coupling agent. Such resin compositions are well known to those skilled in the art, as is their use for consolidating sand into hard fluid permeable masses. A number of such compositions are described in detail in U.S. Pat. Nos. 4,042,032, 4,070,865, 4,829,100, 5,058,676 and 5,128,390 each of which is incorporated herein by reference in its entirety. Methods and conditions for the production and use of such resin coated particulates are disclosed in U.S. Pat. Nos. 6,755,245; 6,866,099; 6,776,236; 6,742,590; 6,446,722, and 6,427,775, each of which is incorporated herein by reference in its entirety. An example of a resin suitable for coating the particulate includes without limitation SANDWEDGE NT conductivity enhancement system that is a resin coating commercially available from Halliburton Energy Services.

In some embodiments, additives may be included in the LP for improving or changing the properties of the HDEP. Examples of such additives include but are not limited to salts, accelerants, surfactants, set retarders, defoamers, settling prevention agents, weighting materials, dispersants, vitrified shale, formation conditioning agents, particulate bridging agents, or combinations thereof. Other conventional property modifying additives, for example, are carbon fibers, glass fibers, metal fibers, minerals fibers, and the like which can be added to further modify the conventional properties. These additives may be included singularly or in combination. Methods for introducing these additives and their effective amounts are known to one of ordinary skill in the art.

In an embodiment, the LP includes water. The water may be fresh water or salt water, e.g., an unsaturated aqueous salt solution or a saturated aqueous salt solution such as brine or seawater.

In an embodiment, the LP comprises a crosslinkable polymer system and a filler. In such an embodiment, the crosslinkable polymer system may be present in an amount of from about 35% to about 90% by volume, and the filler may be present in an amount of from about 8% to about 40% by volume.

Alternatively, the LP comprises a crosslinkable polymer system, a filler and a packing agent. In such an embodiment, the crosslinkable polymer system may be present in an amount of from about 30% to about 90% by volume, the filler may be present in an amount of from about 8% to about 40% by volume, and the packing agent may be present in an amount of from about 1% to about 10% by volume with the remaining volume comprising water and other components as described previously herein.

In an embodiment a LP is prepared by combining the crosslinkable polymer system $H_2$ZERO service providing conformance control system with a filler, FLEXPLUG OBM sealant. The $H_2$ZERO service providing conformance control system is prepared by mixing the HZ-10 low molecular weight polymer consisting of polyacrylamide and an acrylate ester with the HZ-20 polyethylene imine crosslinker. The relative amounts of HZ-10 and HZ-20 to be used in the preparation of $H_2$ZERO can be adjusted to provide gelling within a specified time frame based on reaction conditions such as temperature and pH. For example, the amount of HZ-20 crosslinker necessary for gelling is inversely proportional to temperature wherein higher amounts of HZ-20 are required at lower temperatures to effect formation of a viscous gel. Additionally, gel time can be adjusted to compensate for the pH of the filler material. Adjustment of the $H_2$ZERO service providing conformance control system to provide optimum gelling as a function of temperature and/or pH is known to one of ordinary skill in the art. The filler, FLEXPLUG OBM sealant is an oil-based sealing composition comprising alkyl quaternary ammonium montmorillonite. Without wishing to be limited by theory, such oil-based sealing compositions may function by the hydratable polymer reacting with water in the well bore to immediately hydrate and form a highly viscous gel. The water swellable clay then immediately swells in the presence of water and together with the viscous gel forms a highly viscous sealing mass. The organophilic clay may then react with an oil carrier fluid to add viscosity to the composition so that the polymer and clay do not settle out of the oil prior to reacting with water in the well bore.

In an embodiment, the LP is prepared by combining from about 35% to about 90% by volume $H_2$ZERO service providing conformance control system with from about 8% to about 40% by volume FLEXPLUG OBM sealant with the remaining volume comprising water and other components as described previously herein.

In an embodiment, the LP comprises a thermally activated cement. The thermally activated cement may comprise a hydraulic cement. Herein hydraulic cement refers to a powdered material that develops adhesive qualities and compressive strength when cured with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of such cements are disclosed in U.S. Pat. Nos. 6,457,524; 7,077,203; and 7,174,962, each of which is incorporated herein by reference in its entirety. In an embodiment, an LP comprises sorel cement composition, which typically comprises one or more salts (e.g., chloride or phosphate salt) and a metal oxide, alternatively an alkaline earth metal oxide, alternatively magnesium oxide, MgO. In an embodiment, the MgO comprises without limitation THERMATEK™ HT additive which is commercially available from Halliburton Energy Services. Examples of magnesium oxychloride sealants are disclosed in U.S. Pat. Nos. 6,664,215 and 7,044,222, each of which is incorporated herein by reference in its entirety.

In an embodiment, the LP comprises an organophilic component such as an organophilic clay. Examples of suitable clays include without limitation montmorillonite, bentonite, hectorite, attapulgite, sepiolite and combinations thereof. Alternatively, the LP comprises FLEXPLUG OBM sealant, which is a deformable, viscous, cohesive oil-based composition comprising alkyl quaternary ammonium montmorillonite commercially available from Halliburton Energy Services. In an embodiment, the LP comprises a thermally activated cement and an organophilic product.

In such embodiments, the LP may further comprise an aqueous fluid. The aqueous fluid may be a water-based drilling mud, which may comprise fresh water or salt water, e.g., an unsaturated aqueous salt solution or a saturated aqueous salt solution such as brine or seawater.

In an embodiment, the LP comprises a thermally settable cement and an organophilic component. In such an embodiment, the thermally settable cement may be present in an amount of from about 35% to about 90% by volume, and the organophilic component may be present in an amount of from about 8% to about 40% by volume with the remaining volume comprising water and other components as described previously herein.

In an embodiment a LP is prepared by combining the rigid setting fluid THERMATEK with an organophilic component, FLEXPLUG OBM sealant. In such an embodiment, the LP is prepared by combining from about 35% to about 90% by volume THERMATEK rigid setting fluid with from about 8% to about 40% by volume FLEXPLUG OBM sealant with the remaining volume comprising water and other components as described previously herein.

In an embodiment, the LP is formed as described previously herein. The LP is the pre-polymerized form of the HDEP. Consequently, the complete or partial polymerization of a LP results in the formation of a HDEP. The fluid properties of the pre-polymerized LP are described later herein. A LP may be characterized by its density, and rheology. The density may be measured by a pressurized fluid density balance according to the American Petroleum Institute (API) method found in API Recommended Practice 10B, Section 6. The density of a material suitable for use as an LP may be in the range of from about 0.5 g/cc to about 4.0 g/cc, alternatively from about 0.8 g/cc to about 3 g/cc, alternatively from about 1.0 g/cc to about 2.5 g/cc.

Viscometric flow is described in Chapter 1 of Steffe, where as shear rate is defined in Eq [1.20] on page 13 of Steffe, while viscometric shear stress is defined Eq [1.21] and Eq [1.22] on pages 14 and 15 of Steffe. Yield stress (here after referred to as YP) is defined by Steffe (pages 35-37) as the minimum shear stress required to initiate flow.

Rheology is defined as viscometric shear stress versus shear rate data or models of such data, see Darby (1976) in pages 52-70. Rheology models are commonly in the form (but not limited to) of apparent viscosity as a function of either shear stress or shear rate, as illustrated by Darby (1976) in pages 52 to 70, where he defines apparent viscosity as viscometric shear stress divided by the viscometric shear rate.

Viscosity is a measure of the resistance of a fluid to deform under shear stress. It is a measure of the resistance of a material to flow, and Newton's law of viscosity defines viscosity as the ratio of shear stress to shear rate. A material with a high flow resistance displays a high viscosity. For Newtonian fluids, the shear viscosity, usually represented by $\mu$, is independent of the shear rate. For non-Newtonian fluids, the non-Newtonian viscosity, $\eta$, is dependent on the shear rate. Additionally, some non-Newtonian fluids have a finite yield stress, YP defined above as the minimum shear stress required to initiate flow of a material, see Darby (1976) page 65. For example, peanut butter or tooth paste are familiar materials that are non-Newtonian and have a finite YP. In layman's terms, the YP equates to the stress one must apply to a clump of peanut butter to spread it. Similarly, most cement slurries exhibit YP's. In an embodiment, the apparent viscosities of a LP ranges from about 100 cp to about 2,000,000 cp, within the shear rates typically encountered in servicing wellbores, alternatively ranging from about 10,000 to about 200,000 cp. The YP of a LP may range from about 1 to about 50,000 Pa's, alternatively ranging from about 100 to about 5,000 Pa's.

The rheology the LP may be dependent on its ingredients and the shear stress history that the mixing process induces. The shear stress history may be measured by integrating the volume average shear rate (VASR) versus time history, in which the VASR is measured in units of /1 sec, while the time is in seconds. This method is described in an article by Walters et al. entitled "Kinetic Rheology of Hydraulic Fracturing Fluids" presented at the 2001 Society of Petroleum Engineers Annual Technical Conference, presentation SPE 71660, and incorporated by reference in its entirety. In an embodiment, a LP may have a shear stress history response ranging from about 10 to about 10 million, alternatively from about 5,000 to about 500,000.

The fluid properties of a suitable LP may be optimized in various ways, including, but not limited to, trial and error and computational simulation. A LP can be chosen and tested for use as a liquid plug in a laboratory or in the field, and its ability to prevent intermixing at the fluid interfaces can be determined experimentally. Using trial and error, a suitable LP may be chosen for the specific fluids the LP is being used to separate and the specific wellbore conditions.

Alternatively, a LP having suitable rheological properties may be chosen through computer modeling and simulation of the well behavior during use of a LP as described in U.S. patent application Ser. No. 11/531,579, filed on Sep. 13, 2006 and entitled "Method to Control the Physical Interface between Two or more Fluids." Fluid properties include density, rheological dimensions, chemical composition, and diffusion/mixing coefficients as described herein.

The chemical composition of the LP and thus the HDEP may vary provided that the composition has an operable combination of the various fluid properties described herein. In various embodiments, the LP and thus the HDEP may have a chemical composition characterized by a cross-linked polymer system, a latex based solution, any mineral-based solid suspension such as bentonite clay in water, an emulsion, a naturally produced material such as tree sap, or any fluid containing a material or a combination of materials that provides the beneficial rheological properties described herein. In an embodiment, the LP may comprise a crosslinkable polymer system as was described previously herein.

The components of the LP may be combined in any order desired by the user and then partially or completely polymerized to form a HDEP which is then placed into a wellbore. Pre-polymerized refers to the partial or complete polymerization of the LP to form the HDEP prior to the final placement of the HDEP in the wellbore. In an embodiment, the LP is pre-polymerized to form a HDEP and then the HDEP is placed into the wellbore or other flowspace or conduit such as a riser or pipeline. In an alternative embodiment, the LP is placed in a conduit (e.g., on surface or downhole) and allowed to pre-polymerize prior to and/or during placement downhole. In an embodiment, the LP is polymerized in situ within a conduit or other wellbore servicing equipment or conveyance to form the HDEP.

The components of the LP may be combined using any mixing device compatible with the composition, for example a bulk or recirculating mixer. In an embodiment, the components of the LP are combined at the site of the wellbore and polymerized to form a HDEP. Alternatively, the components of the LP are combined off-site and polymerized to form a HDEP which is then later used at the site of the well. Methods for the preparation of a slurry and polymerization of said slurry to form a HDEP are known to one of ordinary skill in the art.

The HDEP disclosed herein is a highly deformable solid material that approximates Hookean behavior over compressive strains up to 50%. The HDEP may be introduced to a wellbore to function for example as a fluid separator, a backup wiper plug or as a means to seal off or isolate zones in a wellbore. Each of these functions are described in more detail later herein. The HDEP may deform to fit various pipe geometries and thus be able to freely move through pipes of various dimensions.

In an embodiment, the HDEP's mechanical properties are defined primarily, but not limited to, ultimate compressive strength (CS), Young's Modulus (Ey), commonly called the modulus of elasticity, recoverable strain, failure strain, and Poisson's ratio. Steffe (1992) defines Young's Modulus, strain, and Poisson's ratio in pages 8-12. Gere and Timoshenko (1997; Mechanics of Materials; Chapter 1; PWS Publishing Co.; ISBN: 0-534-93429-3 incorporated by reference herein in its entirety) define ultimate stress as the maximum stress a material can withstand before failure. For example, the CS for steel ranges from 80,000 psi to 300,000 psi, while values for rubber are 1,000 to 3,000 psi. Failure strain is simply the strain at which the material failed or reached its CS. Poisson's ratio refers to the ratio of radial strain to axial strain, in the case of unconfined compressive tests, and can range from 0 to 0.5. Typical values of Poisson's ratio are 0.2 to 0.3 for steels; 0.4 to 0.49 for rubber; and 0.05 to 0.15 for cements.

In an embodiment, the HDEPs of this disclosure exhibit a Young's modulus ($E_y$) of from about 1,000 Pas to about 20,000,000 Pas alternatively, from about 20,000 Pas to about 1,000,000 Pas; a compressive strength (CS) of from about 10,000 to about 20,000,000 Pas alternatively from about 50,000 Pas to about 500,000 Pas; a recoverable strain of from about 0.1 to about 0.7 alternatively from about 0.25 to about 0.50, a failure strain of from about 0.25 to about 0.75, alternatively from about 0.50 to about 0.75, and a Poisson's ratio of from about 0.15 to about 0.5 alternatively from about 0.2 to about 0.48.

In an embodiment, a HDEP of the present disclosure may be utilized to control the physical interface between fluids during non-cementing well operations. For example, in an embodiment, a HDEP is used to minimize contamination of both fluids during the displacement of a drilling fluid by a completions fluid. In an embodiment, a HDEP may be used to separate two fluids in a conduit such as for example a pipeline. Minimization of contamination may minimize expense incurred due to loss of valuable drilling fluids and completion brines.

Drilling fluids, cuttings and gelled fluids are often found near the formation wall of an annulus that is to be cemented. In an embodiment, a HDEP is run prior to the introduction of the cement slurry during primary cementing. The increased shear force of the HDEP as compared to the cement slurry may aid in the removal of unwanted materials from the annular wall, enhancing the success of the primary cementing operation in isolating the formation. In an embodiment, particulates are added to the HDEP to act as "gritty" material and aid in the drilling fluid removal. These particulates may be included in the HDEPs to provide abrasiveness to the material such that it may function more effectively as a wiper plug and may be present alone, in combination with, or in lieu of other particulates such as for example packing agents or fillers that were described previously herein.

In an embodiment, the HDEP of this disclosure may function in lieu of or in conjunction with at least one conventional plug. Typically, a conventional plug or plugs (e.g., mechanical plug) is used in an effort to minimize contamination of the cement slurry during placement and to indicate completion of the cementing operation. Conventional plugs are described in U.S. Pat. Nos. 4,190,112; 4,175,619; 4,706,747; 4,756,365; 5,437,330; and 6,196,311, each of which is incorporated by reference herein in its entirety. As these conventional plugs are subject to failure and may be incompatible with a given operation (e.g., mechanical plugs of the required size may not be available), a HDEP may be used in addition to or in place of conventional plugs. In an embodiment, the HDEP is used in addition to or in place of one or more conventional cementing plugs to perform primary cementing of a wellbore. In an embodiment, a HDEP is used in tandem with a conventional plug.

The conventional plug, the HDEP or both may be housed in one or more plug container. A plug container is an apparatus or mechanical device that may house one or more conventional plugs, one or more HDEPs or both and is in fluid communication with the wellbore such as to allow the transfer of the plugs from the plug container into the wellbore. The plug container may also be referred to as a launcher, a launching apparatus, or a cementing head. In some embodiments, the plug container may house a plurality of cementing plugs. In other embodiments, a plurality of plug containers (each housing one or more conventional and/or HDEP plugs) may be stacked or otherwise configured to allow sequential launching of various plug combinations. The plug container may be inserted into the wellbore, alternatively the materials in these containers (e.g. HDEP) may be transferred from the plug container into the wellbore while the plug containers remain on the surface or outside of the wellbore. The plug container may allow for the timed launching of the materials in these containers (e.g. HDEP) either manually or by automatic means. Additionally, the materials may be released into the wellbore sequentially or simultaneously as desired by the process.

In one embodiment, the HDEP is formed by the polymerization of a LP in a plug container. In another embodiment, the HDEP may be polymerized in a separate container possessing user desired dimensions and geometry and then transferred to a plug container. In such embodiments, the HDEP may be pre-molded to fit the dimensions of the plug container before being transferred in the polymerized form to the plug container. In an alternative embodiment, the HDEP may be formed (e.g., polymerized) or placed into a plug container housing a conventional plug. In such embodiments, the HDEP may be "piggy-backed" on the conventional plug container, and thus the conventional plug may be coupled to, completely or partially integrated with, or completely/partially enveloped or surrounded by the HDEP. In an embodiment, the HDEP partially or completely surrounds, envelops, encases, and/or jackets one or more conventional plugs.

Various embodiments utilizing HDEPs that are placed into a wellbore will now be described with reference to the FIGS. 1A-D, wherein like reference numerals are used for like features throughout the several views. Referring to FIG. 1A, in an embodiment a HDEP 200 is housed in a plug container 150, and may be placed into a wellbore 100 as indicated by reference arrow 260. In an embodiment, the plug container is located at the surface as depicted in FIGS. 1A-1D for example as part of a drilling rig or a completion rig. Alternatively, the plug container is located partially or completely in a wellbore for example as part of a retrievable downhole tool. In another embodiment, shown in FIG. 1B, at least one HDEP 200 and at least one conventional plug 250 housed in separate plug containers 150 are used to service a wellbore 100. In such embodiments, the HDEP may be placed in the wellbore in series and/or in parallel with the conventional plug. In an embodiment, the HDEP is inserted into a wellbore ahead of a conventional plug. Alternatively, the HDEP is inserted into a wellbore behind a conventional plug. Alternatively, at least one HDEP may be placed in the wellbore such that it is inserted between two conventional plugs as shown in FIG. 1D. In alternative embodiments, the HDEP and conventional plug may be housed in a single plug container arranged in any order desired by the user. For example, a single plug container 150 may house a conventional plug 250 with a HDEP 200 stacked atop the conventional plug as shown in FIG. 1C, a single plug container 150 may house a conventional plug 250 stacked atop a HDEP 200, or a single plug container may house a conventional plug with a HDEP formed about the conventional plug.

In some embodiments, a HDEP is used in combination with at least one conventional plug. Alternatively, the HDEP is used in combination with more than one conventional plug. In such embodiments, the HDEP may be formed or placed in a plug container which is coupled to one conventional plug container as depicted in FIG. 1B. Configurations comprising two plugs (e.g., one HDEP and one conventional plug) may be referred to herein as secondary plug systems. Alternatively, the HDEP may be formed or placed in a plug container which is coupled to more than one conventional plug container. For example, the HDEP is formed or placed in a plug container that is coupled to two conventional plug containers. Such configurations will be referred to herein as tertiary plug systems. In each of the configurations, the HDEP container may be coupled to the conventional plug container such that when inserted into the wellbore the HDEP container is stacked atop, below, and/or between the conventional plug container. Alternatively, secondary, tertiary, quaternary, etc. plug systems may comprise any combination and sequence of conventional plugs and HDEP contained in the same plug container, separate plug containers, or combinations thereof.

In an embodiment, a HDEP introduced into the wellbore behind a cement slurry assists in the cleaning of the casing during placement of the cement slurry, reducing or eliminating the presence of leftover strings in the casing following displacement. The HDEP may be placed in the wellbore and used in addition to or lieu of a conventional cementing plug. In an embodiment, a HDEP is used in addition to or in lieu of top and bottom cementing plugs in a conventional primary cementing operation.

In an embodiment, a method for the isolation of a zone or wellbore section (e.g., primary cementing comprises placing a combination plug system (e.g., one or more HDEP and one or more conventional plugs) into the wellbore. In such an embodiment, the HDEP may be placed in the wellbore such that it is above or below a conventional plug. For example, the HDEP may function as an independent top or bottom plug which may be deformed to seal off or isolate a zone or wellbore section. The HDEP may be deformed to completely seal off or isolate a zone or wellbore section using any means known to one of ordinary skill in the art such as for example the application of pressure to the HDEP. The HDEPs disclosed herein may deform to dimensions of the wellbore zone or section such as to prevent the flow of fluid to or from said zone or section and thus serve as a backup plug or sealing element to the conventional plug. Alternatively, the HDEP may function as a fluid separator. For example, a combination plug system may be introduced to the wellbore in between two wellbore servicing fluids and may function to prevent the intermingling of said fluids.

In alternative embodiments, a method for the isolation of a zone or wellbore section comprises placing a combination plug system (e.g., a tertiary or quaternary plug system) into a wellbore, for example an HDEP placed between and/or stacked atop two conventional plugs. In such embodiments, the HDEP may function as a backup to the conventional plugs in the event that one of the conventional plugs does not completely seal off or isolate the wellbore section, as a backup wiper plug, as a fluid separator or combinations thereof. For example, an HDEP may be stacked atop a first conventional plug (e.g., a bottom cementing plug), atop a second conventional plug (e.g., a top cementing plug), or both and the HDEP functions as a back-up to the conventional top and/or bottom plug in case of leaks when it lands, as a back-up wiper plug, and/or as a fluid separator. For example, an HDEP may be formed around and envelop all or a portion of a first conventional plug (e.g., a bottom cementing plug), formed around and envelop all or a portion of a second conventional plug (e.g., a top cementing plug), or both and the HDEP functions as a back-up to the conventional top and/or bottom plug in case of leaks when it lands, as a back-up wiper plug, and/or as a fluid separator. The HDEP may be formed around and envelop all or a portion of a conventional plug by pouring a liquid plug into a plug containing housing one or more conventional plugs and allowing the liquid plug to polymerize to form the HDEP.

In some embodiments, a single plug container or launcher may be preloaded with both a conventional plug and a HDEP. The use of a single plug container for both the conventional plug and the HDEP would allow the HDEP to "piggy-back" on top of the conventional plug. In such embodiments, the HDEP may function as a backup to the conventional plug in the event the conventional plug did not completely seal off or isolate the wellbore section, as a backup wiper plug, as a fluid separator or combinations thereof. For example, the HDEP may act as a "washer" to seal any leaks in the flow path around the conventional plug such as those that may be caused by the improper seating or settling of the conventional plug.

In an embodiment, a HDEP functions as a plug to enhance the physical separation of at least two fluids at the interface either separately or in conjunction with a conventional plug. In such embodiments, the HDEP may allow for less than about 10% mixing of the fluids, alternatively less than about 8%, alternatively less than about 7%, alternatively less than about 6%, alternatively less than about 5%, alternatively less than about 4%, alternatively less than about 3%, alternatively less than about 2%, alternatively less than about 1%.

Collars and shoes are commonly used during cementing. These are typically restrictions that are attached to the pipe string. The collar, e.g. float collar, and the shoe, e.g. float shoe, help prevent the backflow of cement during the cementing process, and often comprise a check valve to achieve this prevention of backflow. In an embodiment, a HDEP may provide an indication of when the cement has been displaced from the casing string at a desired depth. As the HDEP flows from the relatively large cross sectional area of the casing to the relatively small cross sectional area of the float shoe or collar, the pressure drop, which is a function of the viscosity of the material flowing through the restriction, would increase due to the high viscosity of the HDEP, yielding a surface pressure spike that may be interpreted as an end of job indicator. In an embodiment, particulates (e.g. sand) are added to the HDEP to increase the surface pressure indication when passing through a restriction.

During conventional primary cementing (i.e. flow of the slurry down the casing and back to the surface through the annulus), it is often difficult to obtain the proper circulation of cement inside the annulus due to a weak formation around the well. In addition, the hydrostatic weight of the cement exerts additional pressure on the formation, especially when increased pressure is applied to the formation to overcome the friction of the cement slurry. One technique used to overcome these difficulties, is reverse circulation cementing. Reverse circulation cementing is described in U.S. Pat. No. 6,920,929 which is incorporated by reference herein in its entirety. In reverse circulation cementing, the cement slurry is pumped down through the annulus and between the casing and the wellbore. While this greatly reduces the total pressure applied to the formation, it has its own challenges. One challenge is that because no conventional plugs can be used as are used in conventional cementing operations, the operator has no way to determine exactly when the cement completely fills the annulus, without the use of some type of expensive and time-consuming tool. The operator runs the risk of either not filling the annulus completely with the cement slurry or of running cement back up inside the casing string, covering potential productive areas and/or incurring additional time and expense to drill out this overrun cement. When reverse circulation is performed, the leading edge of the cement is in the shoe track area, necessitating additional volumes of cement be pumped back up inside the casing during reverse circulation to insure that competent cement is at the bottom of the casing. In an embodiment, a HDEP of the present disclosure is run ahead of the cement slurry in a reverse circulation cementing operation in order to minimize contamination of the cement at the cement/drilling fluid interface. In an embodiment, a HDEP of the present disclosure is introduced into the annulus ahead of the cement slurry in a reverse circulation cementing operation and gives a surface pressure indication of when the cement reaches the bottom of the casing and begins to circulate into the well by contact and/or flow through a narrowed orifice present at the bottom of the chosen casing string.

Secondary cementing operations include cement plugging applications. It is often desired to plug portions of the wellbore for various purposes including forming a foundation for sidetracking or drilling a deviated wellbore from the original wellbore. Typically, an excess volume of cement slurry is pumped into the well to compensate for the adverse effects of contamination of the cement slurry by the drilling fluids present in the wellbore. The excess volume of slurry is to provide enough settable cement to insure a competent plug in view of the fact that a portion of the slurry that gets contaminated will be unsettable. In addition, it is often necessary to place a cement plug a considerable distance from the bottom of the well. These plugs are quite prone to failure due to drilling mud contamination when the density of the slurry exceeds that of the drilling fluid in the wellbore, since gravity increases the intermixing of the fluids, leading to a cement with inadequate compressive strength or improper positioning of the set plug. This can be the case in both vertical and deviated well applications. In an embodiment, a HDEP of the present disclosure, designed to prevent migration of a cement slurry, is introduced into the wellbore prior to and/or after the addition of cement slurry during formation and placement of a cement plug. In an embodiment, a HDEP is introduced into the wellbore ahead of and behind the cement slurry during formation of a cement plug.

If the primary cementing of the casing does not effectively isolate the formations, it may be necessary to perform squeeze cementing, which is the most common type of secondary (remedial) cementing. Methods of squeeze cementing are described in U.S. Pat. Nos. 5,322,124; 4,158,388; and 4,627,496, which are incorporated by reference herein in their entirety. Squeeze cementing is the process of forcing a cement slurry through holes in the casing or liner and into the annulus to plug any channels that may exist in the cement sheath. When the slurry being pumped into the wellbore encounters a permeable formation, cement solids are filtered out of the slurry as the liquid phase is forced into the formation in the form of a cement filtrate. A successful cement squeeze operation will plug the holes and cracks in the cement sheath with cement filter cake that will cure to form an impenetrable barrier. The cement is allowed to set and then a drill bit is lowered on a drill string through the casing to drill out the cement plug normally remaining in the casing. The casing may then be reperforated to continue production. A difficulty associated with squeeze cementing operations is determining when to stop pumping cement. The HDEP may yield a pressure indication by contacting and/or flowing through a restricted flow path. In an embodiment, a HDEP is introduced into a wellbore following the cement slurry during a squeeze cement operation, and yields a surface pressure indication of when to stop. In an embodiment, a HDEP introduced into a wellbore behind squeeze cement seals off the permeability of the formation, enhancing the formation integrity by preventing lost circulation.

In an embodiment, one or multiple HDEPs are introduced into the drill string and pumped down to the lost circulation to seal off a lost circulation zone with little or no interruption of drilling operations and reduction in loss of drilling fluid to the lost zone. In the process of drilling a well low fracture gradients zones, fractured zones, etc. are often encountered and loss of whole drilling fluid to the formation becomes a problem. Significant losses of drilling fluid can impede the progress of drilling the well, add significant cost to the drilling of the well, prevent the drilling of the well to target depth, and/or cause the total loss of the drilled open hole section. Many lost circulation materials and systems are currently commercially available. These systems either require cessation of drilling operations to try to pump some type of treatment to seal off the lost zone or materials are incorporated into drilling fluid to try to "bridge" off the lost circulation zone. The HDEP as disclosed herein may be deformed such that material enters the place where losses are occurring and may help seal off the zone due to flow resistance in small openings where losses are occurring. In an embodiment, a HDEP as disclosed herein when used to prevent lost circulation may comprise packing agents such as sized calcium carbonate or other particulate material. Such packing agents have been previously described herein. The incorporation of particulate material in a HDEP would help deliver the needed lost circulation material directly to the lost zone without having to add it to the entire drilling fluid system.

The HDEPs of this disclosure may provide lost circulation control in a sufficiently short time period to prevent the operator from having to pull out of the hole and thus reducing nonproductive rig time. In an embodiment, the HDEP contains packing agents, including, but not limited to, inert solids, hydrophobic swellable agents, and elastomers, to seal off leaks in and/or around a conventional plug during displacement. Without wishing to be limited by theory, a packing agent of the HDEP may immediately pack off into the lost circulation zones in the subterranean formation. The filler may then squeeze into the lost circulation zones forming a bridge between the larger sized packing agents. In addition, due to the filler within the slurry the amount of crosslinkable polymer system squeezed into the matrix of the surrounding rock may be minimized thus providing a finite layer of rock adjacent to the plug that has negligible permeability and avoids formation damage.

In other embodiments, additives are also pumped into the wellbore with HDEP. For example and without limitation, fluid absorbing materials, resins, aqueous superabsorbers, viscosifying agents, suspending agents, dispersing agents, or combinations thereof can be pumped in with the HDEPs disclosed.

In an embodiment, the wellbore in which the HDEP is positioned belongs to a multilateral wellbore configuration. It is to be understood that a multilateral wellbore configuration includes at least two principal wellbores connected by one or more ancillary wellbores.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

EXAMPLES

The invention having been generally described, the following examples are given as particular embodiments of the invention and to demonstrate the practice and advantages thereof. It is understood that the examples are given by way of illustration and are not intended to limit the specification or the claims in any manner.

Example 1

A HDEP was prepared as described previously herein. The axial stress and plastic deformation of the samples having an inside diameter ($D_i0$) of 5.75 inches and an inside length ($L_i o$) of 6.0 inches were tested as described in Rheological Methods in Food Process Engineering, Second Edition by James Steffe; (1996) Freeman Press East Lansing, Mich.; ISBN 0-9632036-1-4; Library of Congress Catalog Number: 96-83538. The results are given in Table 1 and used to calculate various rheological properties using equations 1 and 2.

$$1/Ey = (1/3G) + (1/9K) \quad (1)$$

$$v = (3K - E/6K) \quad (2)$$

wherein Ey is compression Young's modulus, K is the bulk modulus, G is shear modulus and v is Poisson's ratio.

TABLE 1

| Test | Load (lbf) | D.i. (in) | L.i. (in) | D.i. unloaded (in.) | L.i. unloaded (in. | Stress (psi) | Axial Strain | Volumetric Change (%) | Approx. Modulus (psi) |
|---|---|---|---|---|---|---|---|---|---|
| 1 | 80  | 7.5  | 3.75   |       | 5.0625 | 1.11 | 0.375  | −6.3%  | 4.83 |
| 2 | 120 | 8.25 | 3.375  | 6.625 | 4.875  | 2.25 | 0.4375 | −15.8% | 5.13 |
| 3 | 180 | 8.5  | 2.9375 | 6.625 | 4.75   | 3.17 | 0.5104 | −7.0%  | 6.22 |
| 4 | 240 | 9.25 | 2.625  |       |        | 3.57 | 0.5625 | −13.2% | 6.35 |

Figure 2:
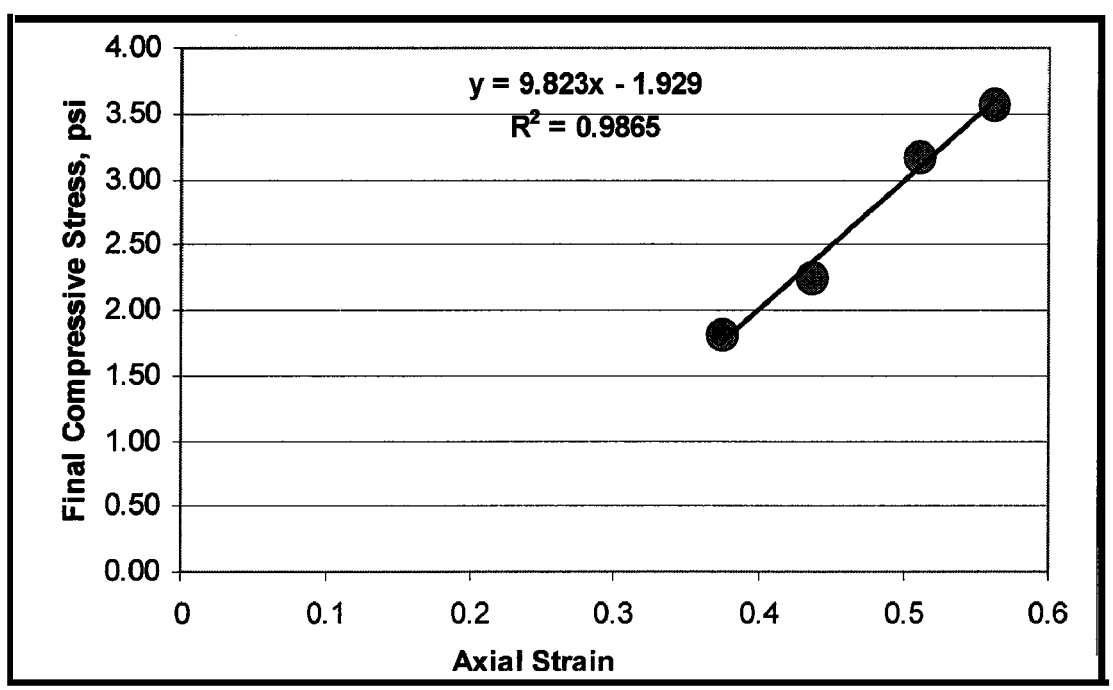
FIG. 2 is a plot of final compressive strength as a function of axial strain of a highly deformable elastic plug according to Example 1.
Figure 3:
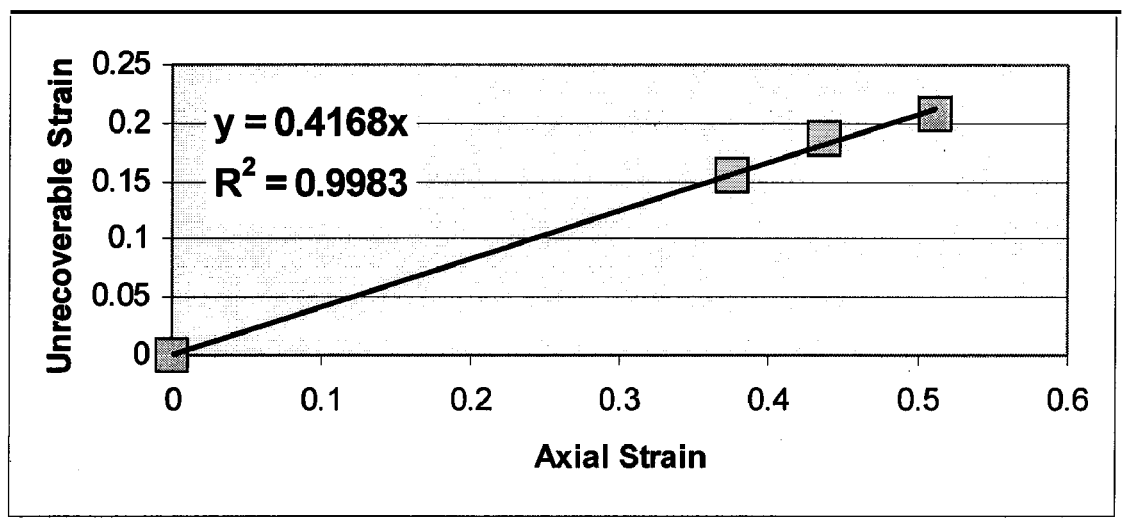
FIG. 3 is a plot of unrecoverable strain as a function of axial strain of a highly deformable elastic plug according to Example 1.

The material was found to have an approximate Young's compression modulus of 9.8 psi, a minimum compressive strength of greater than about 3.6 psi, a bulk modulus of 29 psi and an approximate Poisson's ratio of 0.44. FIGS. 2 and 3 are plots of the final compressive stress as a function of axial strain and a plot of the unrecoverable strain as a function of the axial strain, respectively. The results demonstrate the HDEP of this disclosure is a nonlinear deformable material having a high degree of plasticity.

Example 2

The mechanical properties of an HDEP prepared as described herein were measured, using lubricated unconfined compression tests with cylindrical samples whose length to diameter ratios were maintained between 0.8 and 1.2. The mechanical properties were measured for an HDEP that was processed and cured from a LP. Table 2 lists the components and amounts used to design the LP.

TABLE 2

| Component | Percent of Slurry Weight |
|---|---|
| Water | 25.2% |
| HZ-10 | 25.6% |
| HZ-20 | 8.7% |
| FLEXPLUG OBM | 40.5% |
| Drymix lost circulation material | |

Figure 4:
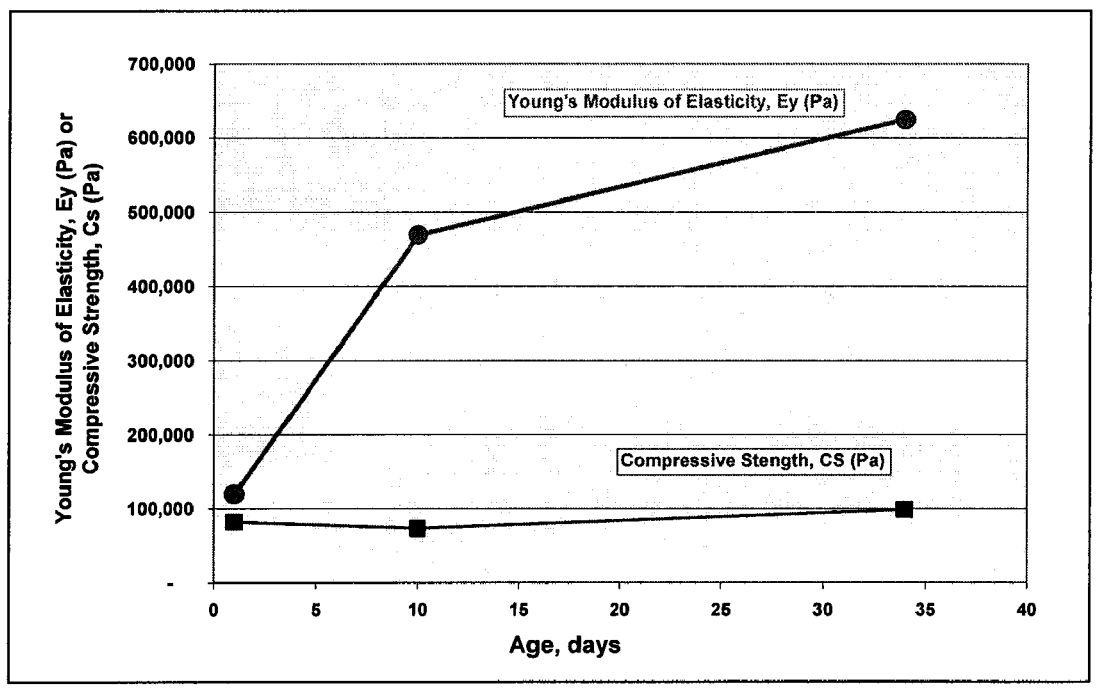
FIG. 4 is a plot of compressive strength and Young's modulus of elasticity as a function of curing age of a highly deformable elastic plug according to Example 2.

To illustrate the impact of curing time at room temperature, three samples were measured with three different ages: 1, 10 and 34 days. Lubricated uniaxial compressive tests were conducted, similar to the method described by Steffe (1992; pages 8-12). Stress values were computed with the Hencky strain method, Eq 1.14 by Steffe (1992; pg 9). Table 3 is a summary of the CS, Ey, strain at failure and Poisson's ratio values at 1, 10 and 30 days of curing at approximately 70 F. FIG. 4 is a plot of the average Ey's and CS's for different diameters of cylinders, vs curing age.

TABLE 3

| Age (days) | Young's Modulus (Pa) | Ultimate Compressive Strength (Pa) | Poisson's Ratio | Failure Strain |
|---|---|---|---|---|
| 1  | 120,000 | 81,700 | 0.39 | 0.59 |
| 10 | 469,000 | 73,000 | 0.32 | 0.70 |
| 34 | 625,000 | 98,700 | 0.33 | 0.59 |

Two observations are important: one is how CS remains relatively constant with age, while the Ey asymptotically approaches a maximum value. From Table 3, it is apparent that for this particular LP formulation, Poisson's ratio and failure strain remain relatively constant with age. The behavior of mechanical properties with age will vary widely with various LP formulations.

What is claimed is:

1. A method of servicing a wellbore comprising:
   preparing a liquid plug;
   allowing the liquid plug to polymerize into a highly deformable elastic plug prior to being placed in the wellbore wherein the polymerization occurs in from about 60 minutes to about 300 minutes and wherein the highly deformable elastic plug comprises a highly deformable solid approximating Hookean behavior at compressive strains up to 50%; and
   placing the highly deformable elastic plug into a wellbore.

2. The method of claim 1 wherein the highly deformable elastic plug is placed into the wellbore and wherein the highly deformable elastic plug performs a function selected from the group consisting of reducing the intermixing of two or more wellbore servicing fluids, sealing off or isolate zones in the wellbore, indicating a surface pressure, acting as a wiper plug and combinations thereof.

3. The method of claim 2 wherein the highly deformable elastic plug reduces the intermixing of two or more wellbore servicing fluids to less than about 10%.

4. The method of claim 1 further comprising deforming the highly deformable elastic plug.

5. The method of claim 4 wherein deforming the highly deformable elastic plug comprises applying pressure to the plug.

6. The method of claim 1 wherein the highly deformable elastic plug has a Young's modulus of from about 1,000 Pa to about 20,000,000 Pa.

7. The method of claim 1 wherein the highly deformable elastic plug has a compressive strength of from about 10,000 Pa to about 20,000,000 Pa.

8. The method of claim 1 wherein the highly deformable elastic plug has a recoverable strain of from about 0.1 to about 0.7.

9. The method of claim 1 wherein the highly deformable elastic plug has a failure strain of from about 0.25 to about 0.75.

10. The method of claim 1 wherein the highly deformable elastic plug has a Poisson's ratio of from about 0.15 to about 0.50.

11. The method of claim 1 further comprising placing at least one conventional plug in the wellbore proximate the highly deformable elastic plug.

12. The method of claim 11 wherein the plugs perform a function selected from the group consisting of fluid separator, wiper system and combinations thereof.

13. The method of claim 11 wherein the highly deformable elastic plug partially or completely polymerizes in a plug container with the conventional plug.

14. The method of claim 1 wherein the liquid plug comprises a crosslinkable polymer system and a filler, wherein the crosslinkable polymer system comprises a water soluble copolymer of a non-acidic ethylenically unsaturated polar monomer and a copolymerizable ethylenically unsaturated ester; a water soluble terpolymer or tetrapolymer of an ethylenically unsaturated polar monomer, an ethylenically unsaturated ester, and a monomer selected from acrylamide-2-methylpropane sulfonic acid, N-vinylpyrrolidone, or both; or combinations thereof; and a crosslinking agent comprising a polyalkyleneimine, a polyfunctional aliphatic amine, an aralkylamine, a heteroaralkylamine, or combinations thereof.

15. The method of claim 14 wherein the crosslinkable polymer system comprises a copolymer of acrylamide and t-butyl acrylate and the crosslinking agent comprises polyethylene imine.

16. The method of claim 14 wherein the filler comprises alkyl quaternary ammonium montmorillonite, bentonite, zeolites, barite, fly ash, calcium sulfate, a hydratable polymer, an organophilic clay, a water-swellable clay, or combinations thereof.

17. The method of claim 1 wherein the liquid plug comprises a packing agent.

18. The method of claim 17 wherein the packing agent is a resin coated particulate.

19. A method of servicing a wellbore comprising:
   preparing a liquid plug;
   allowing the liquid plug to polymerize into a highly deformable elastic plug prior to placement in the wellbore wherein the polymerization occurs in from about 60 minutes to about 300 minutes, and wherein the highly deformable elastic plug comprises a highly deformable solid approximating Hookean behavior at compressive strains up to 50%;
   combining the highly deformable elastic plug with at least one conventional plug to form a plug combination; and
   placing the plug combination into a wellbore.

20. A method of servicing a wellbore comprising:
   preparing a liquid plug;
   allowing the liquid plug to polymerize into a highly deformable elastic plug prior to placement in the wellbore wherein the polymerization occurs in from about 60 minutes to about 300 minutes, and wherein the highly deformable elastic plug comprises a highly deformable solid approximating Hookean behavior at compressive strains up to 50%;
   placing the highly deformable elastic plug into a wellbore; and
   deforming the highly deformable elastic plug.

* * * * *

UNITED STATES PATENT AND TRADEMARK OFFICE
CERTIFICATE OF CORRECTION

PATENT NO.         : 7,740,067 B2                                                Page 1 of 1
APPLICATION NO.    : 11/742430
DATED              : June 22, 2010
INVENTOR(S)        : Daniel Bour et al.

It is certified that error appears in the above-identified patent and that said Letters Patent is hereby corrected as shown below:

Title page, Item 75, replace inventor name "Robert Bales" with --Robert Bates--.

Signed and Sealed this

Twenty-seventh Day of July, 2010

David J. Kappos
*Director of the United States Patent and Trademark Office*